US012122148B2

(12) United States Patent
Fujii et al.

(10) Patent No.: US 12,122,148 B2
(45) Date of Patent: Oct. 22, 2024

(54) INKJET PRINTER AND INKJET PRINTING METHOD USING THE SAME

(71) Applicant: THINK LABORATORY CO., LTD., Chiba (JP)

(72) Inventors: Shota Fujii, Chiba (JP); Tatsuo Shigeta, Chiba (JP)

(73) Assignee: THINK LABORATORY CO., LTD., Chiba (JP)

( * ) Notice: Subject to any disclaimer, the term of this patent is extended or adjusted under 35 U.S.C. 154(b) by 28 days.

(21) Appl. No.: 17/983,498

(22) Filed: Nov. 9, 2022

(65) Prior Publication Data

US 2023/0102600 A1 Mar. 30, 2023

Related U.S. Application Data

(63) Continuation of application No. 16/064,740, filed as application No. PCT/JP2016/086125 on Dec. 6, 2016, now abandoned.

(30) Foreign Application Priority Data

Dec. 25, 2015 (JP) ................................ 2015-254090

(51) Int. Cl.
*B41J 11/00* (2006.01)
*B41J 2/145* (2006.01)
(Continued)

(52) U.S. Cl.
CPC ........... *B41J 11/0022* (2021.01); *B41J 2/145* (2013.01); *B41J 2/2107* (2013.01); *B41J 11/002* (2013.01);
(Continued)

(58) Field of Classification Search
CPC ...... B41J 11/0022; B41J 2/145; B41J 2/2107; B41J 11/002; B41J 15/04;
(Continued)

(56) References Cited

U.S. PATENT DOCUMENTS

| | | | | |
|---|---|---|---|---|
| 6,116,728 A * | 9/2000 | Miyake | B41J 11/0022 | 347/102 |
| 2004/0181967 A1* | 9/2004 | Fujinami | F26B 13/108 | 34/620 |

OTHER PUBLICATIONS

Kishi, Mitsunori, Drying Device, Mar. 25, 1997, Japan, All Pages (Year: 1997).*

(Continued)

*Primary Examiner* — Justin Seo
*Assistant Examiner* — Tracey M McMillion
(74) *Attorney, Agent, or Firm* — McGlew and Tuttle, P.C.

(57) ABSTRACT

An inkjet printer for preventing ink flow, color blurring and color mixing during multicolor printing when image formation is performed with aqueous ink on a web-shaped printing base material, and an inkjet printing method using the inkjet printer. The inkjet printer is configured to perform image formation by discharging aqueous ink to a web-shaped printing base material, and includes: a conveyance mechanism configured to continuously convey the web-shaped printing base material; a single-pass system inkjet head configured to discharge the aqueous ink to a surface of the web-shaped printing base material conveyed by the conveyance mechanism; and a surface pre-heating unit arranged on an upstream side of conveyance from the single-pass system inkjet head and configured to heat at least the surface of the web-shaped printing base material. Image formation is performed on the web-shaped printing base material heated by the surface pre-heating unit.

20 Claims, 4 Drawing Sheets

(51) Int. Cl.
*B41J 2/21* (2006.01)
*B41J 15/04* (2006.01)
*B41M 5/00* (2006.01)
*B41J 2/14* (2006.01)

(52) U.S. Cl.
CPC ............ *B41J 15/04* (2013.01); *B41M 5/0011* (2013.01); *B41J 2002/14475* (2013.01); *B41J 2202/02* (2013.01)

(58) Field of Classification Search
CPC ........ B41J 2002/14475; B41J 2202/02; B41M 5/0011; C09D 11/30
See application file for complete search history.

(56) References Cited

OTHER PUBLICATIONS

Kackmann-Schneider, Klass, Device for Printing, Corresponding Method and Printed Product Oct. 2, 2013, Europe, All Pages (Year: 2013).*

* cited by examiner

INKJET PRINTER AND INKJET PRINTING METHOD USING THE SAME

CROSS REFERENCE TO RELATED APPLICATIONS

This application is a continuation under 37 CFR 1.53(b) of pending prior U.S. patent application Ser. No. 16/064,740 filed Jun. 21, 2018, which claims the benefit (35 U.S.C. § 120 and 365(c)) of International Application PCT/JP2016/086125 filed Dec. 6, 2016, which designated inter alia the United States and which claims the priority of Japanese Patent Application No. 2015-254090 filed Dec. 25, 2015, the entire contents of each application are incorporated herein by reference.

TECHNICAL FIELD

The present invention relates to an inkjet printer which is configured to perform single-pass system image formation with aqueous ink on a web-shaped printing base material, and an inkjet printing method using the inkjet printer.

TECHNICAL BACKGROUND

Hitherto, as a method of performing inkjet printing with aqueous ink on a printing base material through use of an inkjet printer, there has been proposed a method of performing printing while heating the printing base material being conveyed (JP 2014-214160 A).

As a method of heating the printing base material being conveyed as described above, there has been employed a method of heating a back surface of the printing base material through use of a hot plate or the like.

However, even when the back surface of the printing base material is heated through use of the hot plate or the like, there arises the following problem in a case of performing printing while continuously conveying the printing base material. That is, when a printing speed reaches a speed of about 15 m/min, ink flow and color blurring caused by insufficient drying of ink and the like, color mixing during multicolor printing, and the like occur.

Further, as methods of performing printing while continuously conveying the printing base material, there are given a scan system and a single-pass system. Of those systems, the single-pass system is more suitable for high-speed printing because the single-pass system does not require scanning A single-pass system inkjet recording method is disclosed, for example, in JP 2010-142966 A. However, when the printing speed reaches the speed of about 15 m/min as described above, there arises a problem in that ink flow and color blurring caused by insufficient drying of ink and the like, color mixing during multicolor printing, and the like occur, with the result that there is difficulty in increasing the printing speed.

SUMMARY

It is an object of the present invention to provide an inkjet printer which is capable of preventing ink flow and color blurring as well as color mixing during multicolor printing when image formation is performed with aqueous ink on a web-shaped printing base material, and to provide an inkjet printing method using the inkjet printer.

In order to solve the above-mentioned problems, an inkjet printer according to the present invention is an inkjet printer for aqueous ink which is configured to perform image formation by discharging aqueous ink to a web-shaped printing base material, and comprises: a conveyance mechanism configured to continuously convey the web-shaped printing base material; a single-pass system inkjet head configured to discharge, by a single-pass system, the aqueous ink to a surface of the web-shaped printing base material conveyed by the conveyance mechanism; and a surface pre-heating unit which is arranged on an upstream side of conveyance from the single-pass system inkjet head and is configured to heat at least the surface of the web-shaped printing base material, wherein image formation through use of the single-pass system inkjet head is performed on the web-shaped printing base material heated by the surface pre-heating unit.

Heating by the surface pre-heating unit is preferably performed through use of hot air blowing means for applying hot air to the surface of the web-shaped printing base material. As heating other than application of hot air to the surface of the web-shaped printing base material, the web-shaped printing base material can be heated by irradiation with a laser having a wavelength which is equal to an absorption wavelength of the web-shaped printing base material. Heating by irradiation with infrared light is also conceivable. However, when the web-shaped printing base material is a transparent film, infrared light passes through the web-shaped printing base material, with the result that the web-shaped printing base material is not heated. Therefore, in the case of heating by irradiation with infrared light, it is necessary that the web-shaped printing base material have black color or that the web-shaped printing base material be a base material having such a wavelength as to absorb infrared light. A combination of the above-mentioned heating through use of the hot air blowing means, heating by irradiation with a laser, and heating by irradiation with infrared light can also be used.

For example, hot air at a temperature of from 40° C. to 80° C. is preferably applied to the surface of the web-shaped printing base material through use of the hot air blowing means.

The hot air blowing means preferably comprises: a nozzle group main body having a plurality of slit-shaped hot air blowing nozzles arranged so as to form gaps therebetween, the plurality of slit-shaped hot air blowing nozzles each having a slit-shaped hot air outlet port extending in a width direction of the web-shaped printing base material; and a suction mechanism configured to suck an atmosphere of the gaps formed in the nozzle group main body.

The inkjet printer preferably further comprises a back surface heating unit configured to heat a back surface of the web-shaped printing base material. Heating by the back surface heating unit is preferably performed through use of hot air blowing means or a hot plate.

Further, heating means similar to the above-mentioned surface pre-heating unit may be arranged, as a surface post-heating unit, on a downstream side of conveyance of the web-shaped printing base material from the inkjet head.

The web-shaped printing base material is preferably a transparent film. As the web-like printing base material being the transparent film, a transparent film using PET (polyethylene terephthalate), PVC (polyvinyl chloride), PP (polypropylene), or the like may be suitably used.

An inkjet printing method according to the present invention comprises performing, through use of the said inkjet printer, single-pass system image formation through use of the single-pass system inkjet head with aqueous ink on the web-shaped printing base material heated by the surface pre-heating unit of the inkjet printer.

According to the present invention, there is provided a remarkable effect of being capable of providing an inkjet printer which is capable of preventing ink flow and color blurring, and color mixing during multicolor printing when image formation is performed with aqueous ink on a web-shaped printing base material, and an inkjet printing method using the inkjet printer.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
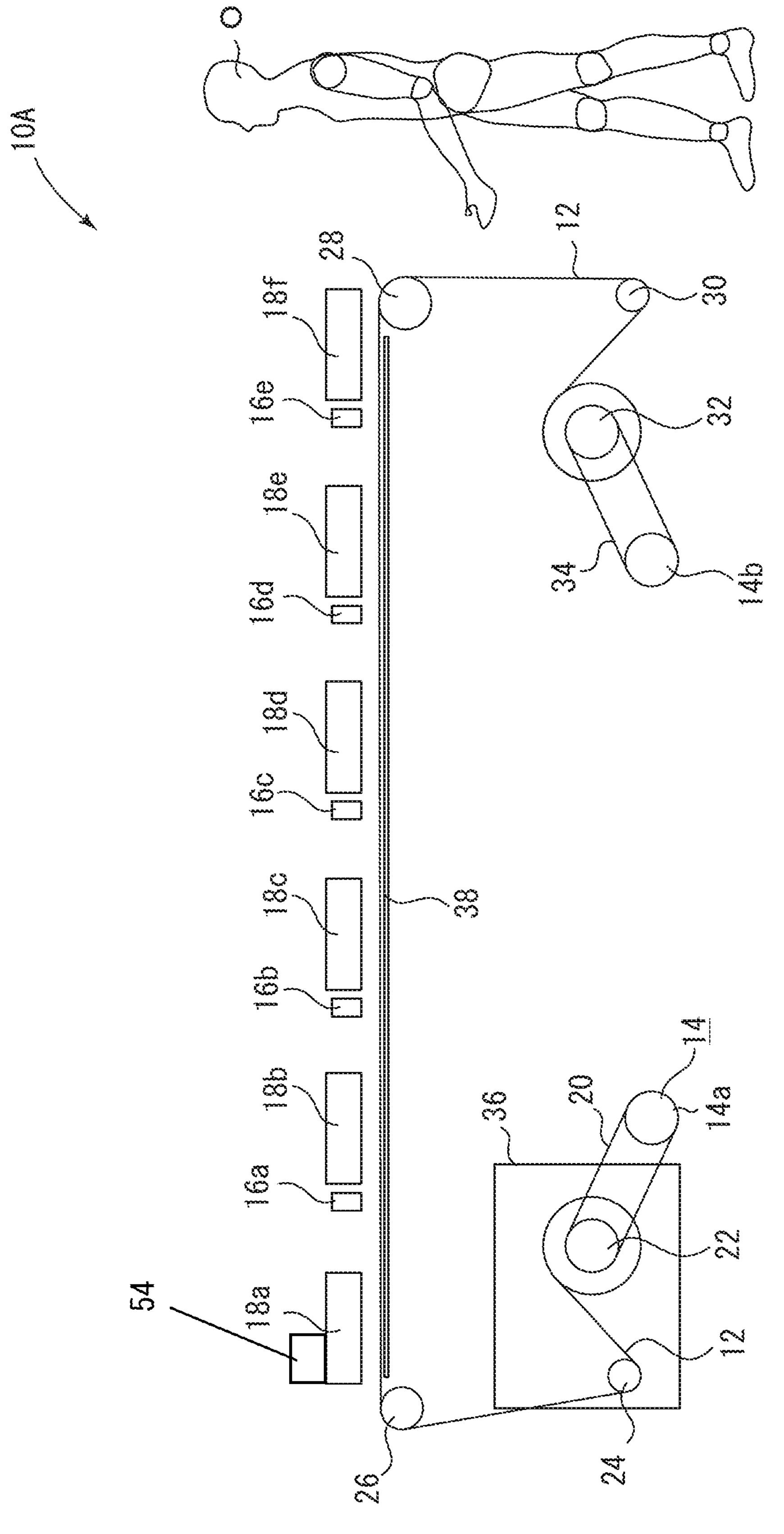
FIG. 1 is a sectional structural view for illustrating one embodiment of an inkjet printer according to the present invention.

Referring to the drawings, FIG. 1 is a sectional structural view for illustrating one embodiment of an inkjet printer according to the present invention.

In FIG. 1, the reference symbol 10A denotes an inkjet printer of the present invention. The inkjet printer 10A is an inkjet printer for aqueous ink which is configured to perform image formation by discharging aqueous ink to a web-shaped printing base material 12. The inkjet printer 10A comprises: a conveyance mechanism 14 (conveyance mechanisms 14*a* and 14*b* in the illustrated embodiment) configured to continuously convey the web-shaped printing base material 12; single-pass system inkjet heads 16*a* to 16*e* configured to discharge, by a single-pass system, aqueous ink to a surface of the web-shaped printing base material 12 conveyed by the conveyance mechanism 14; and surface pre-heating units 18*a* to 18*e* which are arranged on an upstream side of conveyance from the inkjet heads 16*a* to 16*e* and are configured to heat at least the surface of the web-shaped printing base material 12. The ink is discharged by the inkjet heads 16*a* to 16*e* to the web-shaped printing base material 12 heated by the surface pre-heating units 18*a* to 18*e*. Further, surface post-heating units 18*b* to 18*f* are arranged on a downstream side of conveyance from the inkjet heads 16*a* to 16*e* so that drying of aqueous ink discharged by the inkjet heads 16*a* to 16*e* is further accelerated.

The surface pre-heating units 18*b* to 18*e* also act as surface post-heating units and also serve as the surface post-heating units 18*b* to 18*e*.

As the inkjet heads 16*a* to 16*e*, various known single-pass system inkjet discharge devices can be used.

As the conveyance mechanism 14, any known mechanism can also be used as long as the mechanism can convey the web-shaped printing base material 12. As illustrated in FIG. 1, it is possible to adopt a configuration comprising drive belts 20 and 34, an original roller 22 around which the web-shaped printing base material 12 is wound, various rollers 24, 26, 28, and 30 configured to convey the web-shaped printing base material 12, and a roll-up roller 32 configured to roll up the printed web-shaped printing base material 12. There is illustrated an operator O of the inkjet printer.

Further, the original roller 22 around which the web-shaped printing base material 12 is wound is accommodated in a heating box 36, and is heated in advance (pre-heated) to a temperature of from 60° C. to 70° C. As a method of heating in the heating box 36, heating may be performed with hot air or by various known heaters. In the illustrated example, there is illustrated a configuration in which the inside of the heating box 36 is heated with hot air.

At least the surface of the web-shaped printing base material 12 heated in advance as described above is heated by the surface pre-heating unit 18*a* arranged on the upstream side of conveyance from the inkjet heads 16*a* to 16*e*. As the surface pre-heating unit 18*a*, an example is given of hot air blowing means. In the hot air blowing means, hot air at a temperature of from about 40° C. to about 80° C., for example, a temperature of 70° C. is applied to the surface of the web-shaped printing base material 12. A time period for applying hot air is from about 2 seconds to about 3 seconds in the case of a printing speed of 15 m/min, but is appropriately changed also depending on the temperature of the hot air.

Figure 2:
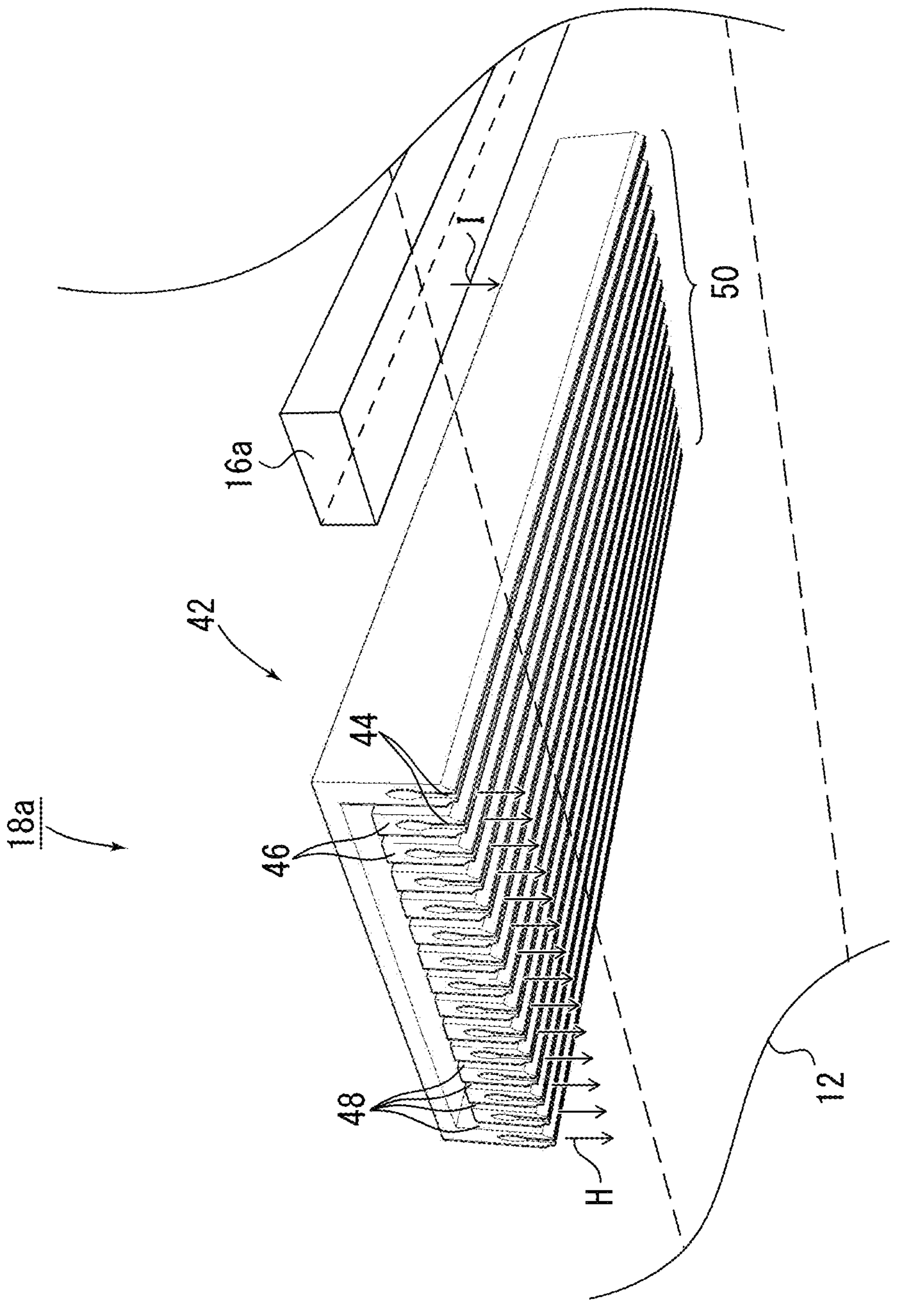
FIG. 2 is a perspective view for illustrating an embodiment of hot air blowing means to be used in the inkjet printer of the present invention.

An embodiment of the hot air blowing means to be used as the surface pre-heating units 18*a* to 18*e* is illustrated in FIG. 2. As is well illustrated in FIG. 2, as hot air blowing means 42 being the surface pre-heating unit 18*a*, it is possible to adopt a configuration comprising a nozzle group main body 50 having a plurality of slit-shaped hot air blowing nozzles 46 arranged so as to form gaps 48 therebetween, the slit-shaped hot air blowing nozzles 46 each having a slit-shaped hot air outlet port 44 extending in a width direction of the web-shaped printing base material 12, and a suction mechanism (not shown) configured to suck an atmosphere of the gaps 48 formed in the nozzle group main body 50. The atmosphere of the gaps 48 is sucked in a direction opposite to blowing of hot air H (direction opposite to the arrow of FIG. 2) by the suction mechanism 54. As the suction mechanism, various known suction devices can be used and hence illustration thereof is omitted. Thus, the effect of reducing color blurring and the like caused by aqueous ink is achieved through suction of the atmosphere of the gaps 48.

Figure 3:
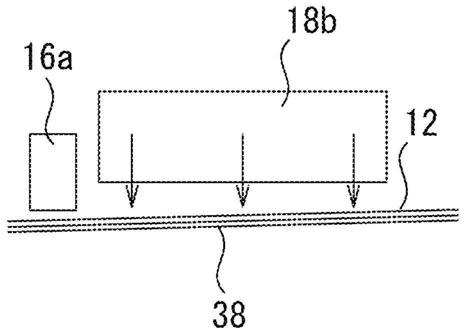
FIG. 3 is an enlarged view for illustrating a main portion of FIG. 1.

Further, in the example illustrated in FIG. 1, as is well illustrated in FIG. 3, there is illustrated an example in which hot air blowing means similar to the hot air blowing means serving as the surface pre-heating unit 18*a* is used also as the surface post-heating unit 18*b* and arranged on the downstream side of conveyance from the inkjet head 16*a*. As is well illustrated in FIG. 1 and FIG. 2, the inkjet heads 16*a* to 16*e* are inkjet heads having respective ink storage tanks (not shown) for cyan (C), magenta (M), yellow (Y), black (B), and white (W), and aqueous ink I of respective colors is discharged from the inkjet heads 16*a* to 16*e*.

Further, in the embodiment illustrated in FIG. 1, a back surface heating unit 38 configured to heat the web-shaped printing base material 12 from a back surface thereof is arranged. As the back surface heating unit 38, a known hot plate can be used, and for example, an electrothermal heater having a filament laid on a ceramic plate can be used. When the hot plate is used as the back surface heating unit 38, it is suitable that the hot plate be used after being heated to a temperature of, for example, from 40° C. to 65° C. It is appropriate that the back surface heating unit 38 be arranged so as to correspond to the inkjet heads 16*a* to 16*e*. The back surface heating unit 38 may also be arranged across setting positions of the inkjet heads 16*a* to 16*e* as illustrated in FIG. 1, or can also be arranged in accordance with each setting position of the inkjet heads 16*a* to 16*e*.

Further, as the back surface heating unit 38, the hot air blowing means similar to the surface pre-heating unit 18*a* can also be used. Further, when the hot air blowing means is used as the back surface heating unit 38, it is suitable that, for example, hot air at a temperature of from 40° C. to 80° C. be applied to the back surface of the web-shaped printing base material 12.

Figure 4:
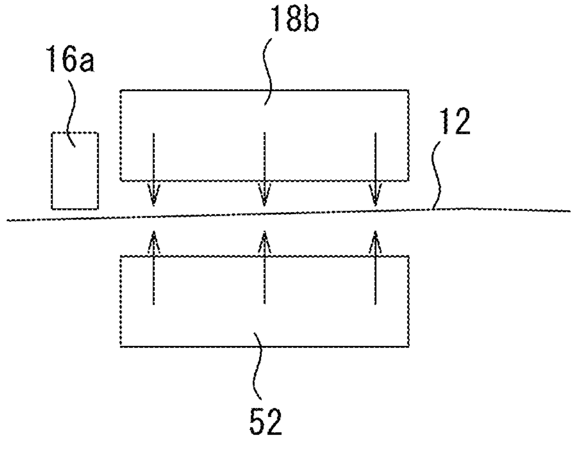
FIG. 4 is an enlarged view for illustrating a main portion of another embodiment of an inkjet printer according to the present invention.

In FIG. 4, there is illustrated an example in which the hot air blowing means is used as the back surface heating unit 38. In FIG. 4, there is illustrated hot air blowing means 52 serving as the back surface heating unit 38. The configuration other than arrangement of the hot air blowing means 52 as the back surface heating unit 38 is the same as the above-mentioned configuration.

Figure 5:
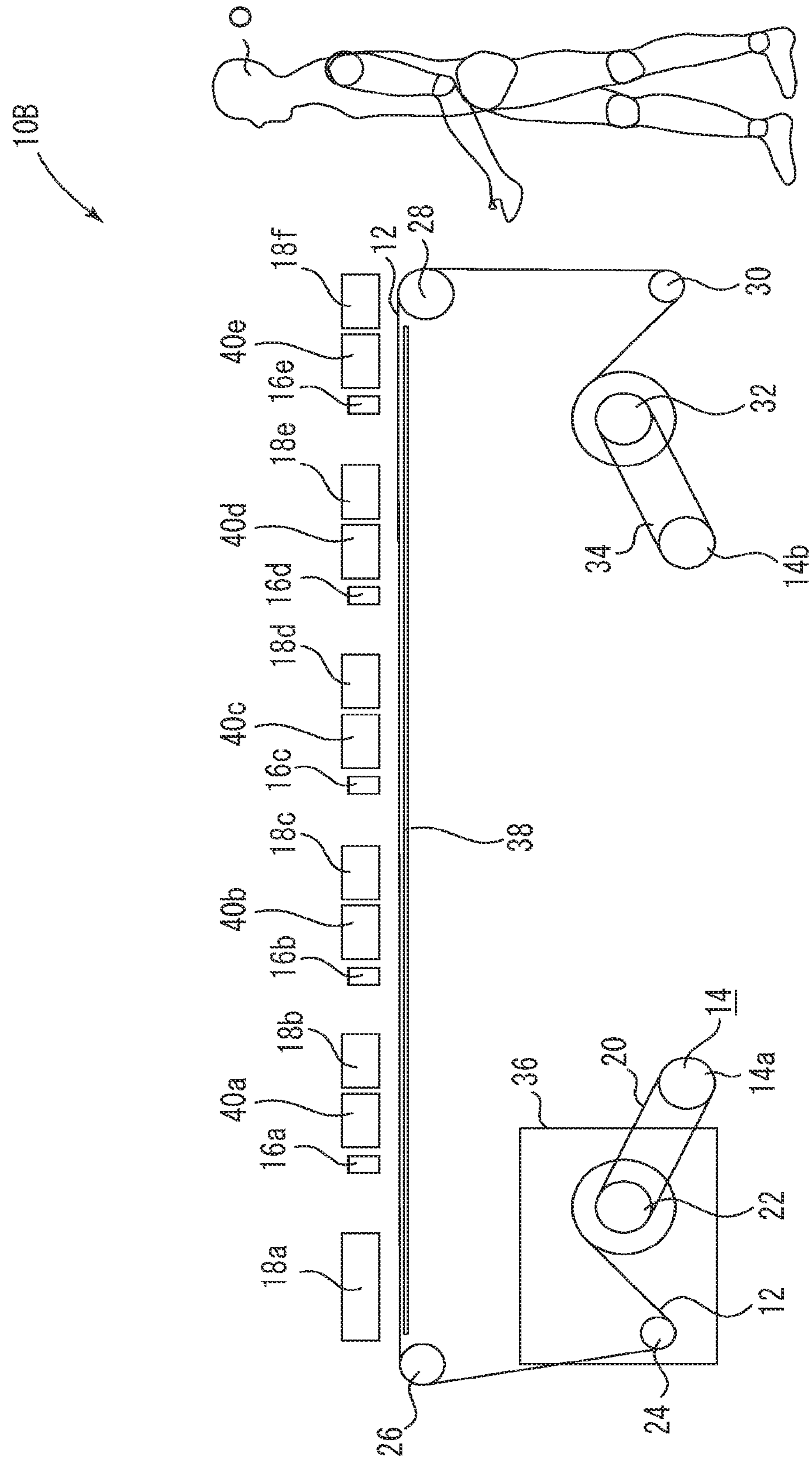
FIG. 5 is an enlarged view for illustrating a main portion of still another embodiment of an inkjet printer according to the present invention.

Next, still another embodiment of an inkjet printer according to the present invention is illustrated in FIG. 5.

In FIG. 5, the reference symbol 10B denotes another embodiment of an inkjet printer of the present invention. In the inkjet printer 10B, as additional surface post-heating units, laser irradiation devices 40*a* to 40*e* are arranged on the downstream side of conveyance from the inkjet heads 16*a* to 16*e*. The configuration of the inkjet printer 10B is the same as that of the inkjet printer 10A described above except that the laser irradiation devices 40*a* to 40*e* are arranged.

With the inkjet printers 10A and 10B constructed as described above, when ink discharge by the inkjet heads 16*a* to 16*e* is performed with aqueous ink to the web-shaped printing base material 12 heated by the surface pre-heating unit 18*a* of the inkjet printers 10A and 10B, printing can be suitably performed with respect to a transparent PET film as the web-shaped printing base material without ink flow and color blurring, color mixing during multicolor printing, and the like even at a printing speed of 15 m/min. Further, as illustrated in the inkjet printers 10A and 10B, when the surface post-heating units and the back surface heating unit are combined, ink flow and ink blurring, color mixing during multicolor printing, and the like are further eliminated, and printing can be suitably performed.

While specific embodiments of the invention have been shown and described in detail to illustrate the application of the principles of the invention, it will be understood that the invention may be embodied otherwise without departing from such principles.

What is claimed is:

1. An inkjet printer for aqueous ink which is configured to perform image formation by discharging aqueous ink to a web-shaped printing base material, the inkjet printer comprising:

a conveyance mechanism configured to continuously convey the web-shaped printing base material, the conveyance mechanism comprising a first roller and a second roller, wherein a portion of the web-shaped printing base material extends between the first roller and the second roller, the portion of the web-shaped printing base material extending linearly between the first roller and the second roller;

a surface post heating unit;

a single-pass system inkjet head configured to discharge, by a single-pass system, the aqueous ink to a surface of the portion of the web-shaped printing base material conveyed by the conveyance mechanism, the surface post heating unit being located adjacent to the single-pass system inkjet head on a downstream side of the single-pass system inkjet head; and a surface pre-heating unit arranged on an upstream side of conveyance from the single-pass system inkjet head and the surface pre-heating unit being configured to heat at least the surface of the portion of the web-shaped printing base material, wherein image formation through use of the single-pass system inkjet head is performed on the web-shaped printing base material heated by the surface pre-heating unit, wherein heating by the surface pre-heating unit is performed via a hot air blowing means for applying hot air to the surface of the portion of the web-shaped printing base material, wherein the hot air blowing means comprises:

a nozzle group main body having a plurality of slit-shaped hot air blowing nozzles arranged to form gaps therebetween, each of the plurality of slit-shaped hot air blowing nozzles having a slit-shaped hot air outlet port extending in a width direction of the web-shaped printing base material, at least one of the slit-shaped hot air blowing nozzles being configured to deliver the hot air in a first direction to the surface of the portion of the web-shaped printing base material, each of the plurality of slit-shaped hot air blowing nozzles comprising a first interior surface portion and a second interior surface portion, the first interior surface portion and the second interior surface portion being parallel to the first direction, the first interior surface portion and the second interior surface portion defining at least a portion of an outlet of the slit-shaped hot air outlet port; and a suction mechanism configured to suck an atmosphere of the gaps formed in the nozzle group main body such that fluid in at least one of the gaps moves in a second direction, the second direction being opposite the first direction.

2. An inkjet printer according to claim 1, further comprising a back surface heating unit configured to heat a back surface of the portion of the web-shaped printing base material, the back surface heating unit being located on one side of the portion of the web-shaped printing base material, the surface pre-heating unit being located on another side of the portion of the web-shaped printing base material, the one side being opposite the another side, the back surface heating unit and the surface pre-heating unit being located between the first roller and the second roller.

3. An inkjet printer according to claim 2, wherein heating by the back surface heating unit is performed via one of a hot air blowing means and a hot plate.

4. An inkjet printer according to claim 1, wherein the web-shaped printing base material is a transparent film.

5. An inkjet printer in according to claim 2, wherein the surface pre-heating unit and the back surface heating unit are perpendicular to the portion of the web-shaped printing base material.

6. An inkjet printer according to claim 3, wherein each of the gaps is defined by at least a portion of one of the nozzles and at least a portion of another one of the nozzles, wherein the suction mechanism is configured to suck the atmosphere of the gaps such that the fluid in each of the gaps moves in the second direction.

7. An inkjet printing method, comprising:

providing an inkjet printer comprising:

a conveyance mechanism configured to continuously convey a web-shaped printing base material, the conveyance mechanism comprising a first roller and a second roller, wherein a portion of the web-shaped printing base material extends between the first roller and the second roller, the portion of the web-shaped printing base material extending linearly between the first roller and the second roller;

a surface post heating unit;

a single-pass system inkjet head configured to discharge, by a single-pass system, the aqueous ink to a surface of the portion of the web-shaped printing base material conveyed by the conveyance mechanism, the surface post heating unit being located adjacent to the single-pass system inkjet head on a downstream side of the single-pass system inkjet head; and a surface pre-heating unit arranged on an upstream side of conveyance from the single-pass system inkjet head and the surface pre-heating unit is configured to heat at least the surface of the web-shaped printing base material, wherein heating by the surface pre-heating unit is performed via a hot air blowing means for applying hot air to the surface of the portion of the web-shaped printing base material, wherein the hot air blowing means comprises:

a nozzle group main body having a plurality of slit-shaped hot air blowing nozzles arranged to form gaps therebetween, each of the plurality of slit-shaped hot air blowing nozzles having a slit-shaped hot air outlet port extending in a width direction of the web-shaped printing base material, at least one of the nozzles being configured to deliver the hot air in a first direction to the surface of the portion of the web-shaped printing base material, each of the plurality of slit-shaped hot air blowing nozzles comprising a first interior surface portion and a second interior surface portion, the first interior surface portion and the second interior surface portion being parallel to the first direction, the first interior surface portion and the second interior surface portion defining at least a portion of an outlet of the slit-shaped hot air outlet port; and a suction mechanism configured to suck an atmosphere of the gaps formed in the nozzle group main body such that fluid in one or more of the gaps moves in a second direction, the second direction being opposite the first direction; and performing, via the inkjet printer, single-pass system image formation via the single-pass system inkjet head with aqueous ink on the web-shaped printing base material heated by the surface pre-heating unit of the inkjet printer.

8. An inkjet printing method according to claim 7, further comprising:

providing a back surface heating unit configured to heat a back surface of the portion of the web-shaped printing base material, the back surface heating unit being located on one side of the portion of the web-shaped printing base material, the surface pre-heating unit being located on another side of the portion of the web-shaped printing base material, the one side being opposite the another side, the back surface heating unit and the surface pre-heating unit being located between the first roller and the second roller.

9. An inkjet printing method according to claim 8, wherein heating by the back surface heating unit is performed via one of a hot air blowing means and a hot plate.

10. An inkjet printing method according to claim 8, wherein the surface pre-heating unit and the back surface heating unit are perpendicular to the portion of the web-shaped printing base material.

11. An inkjet printing method according to claim 7, wherein the web-shaped printing base material is a transparent film.

12. An inkjet printing method according to claim 7, wherein each of the gaps is defined by at least a portion of one of the nozzles and at least a portion of another one of the nozzles.

13. An inkjet printing method according to claim 7, wherein heating by the surface post heating unit is performed via another hot air blowing means for applying the hot air to the surface of another portion of the web-shaped printing base material, wherein the another hot air blowing means comprises:

another nozzle group main body having a plurality of another slit-shaped hot air blowing nozzles arranged to form another gaps therebetween, each of the plurality of another slit-shaped hot air blowing nozzles having another slit-shaped hot air outlet port extending in the width direction of the web-shaped printing base material, at least one of the plurality of another slit-shaped hot air blowing nozzles being configured to deliver hot air in another direction to the surface of the another portion of the web-shaped printing base material; and another suction mechanism configured to suck the atmosphere of at least one of the another gaps formed in the another nozzle group main body in a direction opposite the another direction.

14. An inkjet printer for aqueous ink which is configured to perform image formation by discharging aqueous ink to a web-shaped printing base material, the inkjet printer comprising:

a conveyance mechanism configured to continuously convey the web-shaped printing base material, the conveyance mechanism comprising a first roller and a second roller, wherein a portion of the web-shaped printing base material extends between the first roller and the second roller in a conveying web-shaped printing base material;

a single-pass system inkjet head configured to discharge, by a single-pass system, the aqueous ink in a direction perpendicular to the conveying web-shaped printing base material to a surface of the portion of the web-shaped printing base material conveyed by the conveyance mechanism;

a surface pre-heating unit arranged on an upstream side of conveyance from the single-pass system inkjet head and the surface pre-heating unit being configured to heat at least the surface of the portion of the web-shaped printing base material, wherein image formation through use of the single-pass system inkjet head is performed on the web-shaped printing base material heated by the surface pre-heating unit, wherein heating by the surface pre-heating unit is performed via a hot air blowing means for applying hot air to the surface of the portion of the web-shaped printing base material, wherein the hot air blowing means comprises:

a nozzle group main body having a plurality of slit-shaped hot air blowing nozzles arranged to form gaps therebetween, each of the plurality of slit-shaped hot air blowing nozzles having a slit-shaped hot air outlet port extending in a width direction of the web-shaped printing base material, at least one of the plurality of slit-shaped hot air blowing nozzles being configured to deliver hot air in a first direction to the surface of the portion of the web-shaped printing base material, each of the plurality of slit-shaped hot air blowing nozzles comprising a first interior surface portion and a second interior surface portion, the first interior surface portion and the second interior surface portion being parallel to the first direction, the first interior surface portion and the second interior surface portion defining at least a portion of an outlet of the slit-shaped hot air outlet port; and a suction mechanism configured to suck an atmosphere of at least one of the gaps formed in the nozzle group main body in a second direction, the second direction being opposite the first direction; and a second heating unit arranged adjacent to the single-pass system inkjet head.

15. An inkjet printer according to claim 14, wherein the portion of the web-shaped printing base material extends linearly between the first roller and the second roller.

16. An inkjet printer according to claim 15, further comprising a back surface heating unit configured to heat a back surface of the portion of the web-shaped printing base material, the back surface heating unit being located on one side of the portion of the web-shaped printing base material, the surface pre-heating unit being located on another side of the portion of the web-shaped printing base material, the one side being opposite the another side, the back surface heating unit and the surface pre-heating unit being located between the first roller and the second roller.

17. An inkjet printer according to claim 16, wherein heating by the back surface heating unit is performed via one of a hot air blowing means and a hot plate.

18. An inkjet printer according to claim 16, wherein the surface pre-heating unit and the back surface heating unit are perpendicular to the portion of the web-shaped printing base material.

19. An inkjet printer according to claim 14, wherein each of the gaps is defined by at least a portion of one of the nozzles and at least a portion of another one of the nozzles.

20. An inkjet printing according to claim 14, wherein heating by the second heating unit is performed via another hot air blowing means for applying hot air to the surface of another portion of the web-shaped printing base material, wherein the another hot air blowing means comprises:

another nozzle group main body having a plurality of another slit-shaped hot air blowing nozzles arranged to form another gaps therebetween, each of the plurality of another slit-shaped hot air blowing nozzles having another slit-shaped hot air outlet port extending in the width direction of the web-shaped printing base material, at least one of the another slit-shaped hot air blowing nozzles being configured to deliver the hot air in another direction to the surface of the another portion of the web-shaped printing base material; and another suction mechanism configured to suck the atmosphere of at least another one of the another gaps formed in the another nozzle group main body in a direction opposite the another direction.

* * * * *